(12) United States Patent
Stefani

(10) Patent No.: US 8,494,778 B2
(45) Date of Patent: Jul. 23, 2013

(54) VARIABLE GRID FOR FINITE DIFFERENCE COMPUTATION

(75) Inventor: Joseph P. Stefani, San Francisco, CA (US)

(73) Assignee: Chevron U.S.A. Inc., San Ramom, CA (US)

( * ) Notice: Subject to any disclaimer, the term of this patent is extended or adjusted under 35 U.S.C. 154(b) by 476 days.

(21) Appl. No.: 12/573,655

(22) Filed: Oct. 5, 2009

(65) Prior Publication Data

US 2011/0082645 A1    Apr. 7, 2011

(51) Int. Cl.
*G01V 1/00* (2006.01)
*G01V 1/28* (2006.01)

(52) U.S. Cl.
CPC ............ *G01V 1/28* (2013.01); *G01V 2210/673* (2013.01)
USPC .............................................. 702/14; 703/10

(58) Field of Classification Search
USPC .......................................................... 702/14
See application file for complete search history.

(56) References Cited

U.S. PATENT DOCUMENTS

| | | | | |
|---|---|---|---|---|
| 4,464,737 A | * | 8/1984 | Pann | 367/49 |
| 4,745,585 A | | 5/1988 | Larner | |
| 4,933,911 A | * | 6/1990 | Sondergeld et al. | 367/13 |
| 5,128,866 A | * | 7/1992 | Weakley | 702/11 |
| 5,394,325 A | * | 2/1995 | Schneider, Jr. | 702/18 |
| 5,657,223 A | * | 8/1997 | Juszczak et al. | 705/400 |
| 5,999,488 A | * | 12/1999 | Smith | 367/50 |
| 6,324,478 B1 | | 11/2001 | Popovici et al. | |
| 6,615,139 B1 | * | 9/2003 | Chakravarthi | 702/2 |
| 6,643,590 B2 | | 11/2003 | Wiggins | |
| 6,675,102 B1 | | 1/2004 | Baker | |
| 6,687,659 B1 | * | 2/2004 | Shen | 703/2 |
| 2004/0000910 A1 | * | 1/2004 | Tryggvason | 324/331 |
| 2006/0058965 A1 | * | 3/2006 | Ricard et al. | 702/14 |
| 2006/0155477 A1 | * | 7/2006 | Matson et al. | 702/14 |

FOREIGN PATENT DOCUMENTS

EP    297737 A2 *   1/1989

OTHER PUBLICATIONS

Using Logarithmic Scales to Clearly Communicate Chart Data, http://blogs.infragistics.com/silverlight/articles/using-logarithmic-scales-to-clearly-communicate-chart-data.aspx, Last Accessed (Nov. 17, 2011).*
Brennan, John, Linear vs. Log Scale, http://www.ehow.com/info_8745947_linear-vs-log-scale.html, Last Accessed (Nov. 17, 2011).*
C. Wu and J.M. Harris, "An optimized variable-grid finite-difference method for seismic forward modeling," Journal of Seismic Exploration, vol. 12, 343-353, 2004.*
Definition of "Expand", thefreedictionary.com, http://www.thefreedictionary.com/p/expanding.*

(Continued)

*Primary Examiner* — Sujoy Kundu
*Assistant Examiner* — Timothy H Hwang
(74) *Attorney, Agent, or Firm* — Marie L. Clapp

(57) ABSTRACT

A computer system and a computer-implemented method for evaluating a geophysical model using a grid of points representing locations in a subsurface geological region are disclosed. The method includes storing a geophysical model of the subsurface geological region in a computer readable memory and defining, for the geophysical model, the grid of points representing the locations in the subsurface geological region. The grid of points comprise a plurality of points extending in at least one direction. The plurality of points are variably spaced apart in the at least one direction. The method further includes evaluating, by the computer, the geophysical model using the grid of points.

15 Claims, 5 Drawing Sheets

OTHER PUBLICATIONS

Owusu, K. et al., Velocity Estimates Derived From Three-Dimensional Seismic Data, Geophysics, Nov. 1983, V. 48, No. 11, pp. 1486-1497).*

Definition of "Tangible", thefreedictionary.com, http://www.thefreedictionary.com/p/tangible.*

* cited by examiner

VARIABLE GRID FOR FINITE DIFFERENCE COMPUTATION

FIELD OF THE INVENTION

The present invention pertains in general to computation methods and more particularly to a computer system and computer-implemented method for evaluating a geophysical model using a grid of points representing locations in a subsurface geological region.

BACKGROUND OF THE INVENTION

Finite difference calculations using a computer are generally computer and time intensive due to the number of points involved in the calculation. For example, in geophysical models, as many as a billion points ($10^9$ points) can be used in the computation of the geophysical models. Generally, the greater the number of points the greater is the period of time required to perform the calculation. The calculation time can be reduced by increasing the computational resources, for example by using multi-processor computers or by performing the calculation in a networked distributed computing environment. However, this requires expensive computer resources which can increase the overall cost of the calculation.

The present invention addresses various issues relating to the above.

SUMMARY OF THE INVENTION

An aspect of the present invention is to provide a computer-implemented method for evaluating a geophysical model using a grid of points representing locations in a subsurface geological region. The method includes storing a geophysical model of the subsurface geological region in a computer readable memory and defining, for the geophysical model, the grid of points representing the locations in the subsurface geological region. The grid of points comprise a plurality of points extending in at least one direction. The plurality of points are variably spaced apart in the at least one direction. The method further includes evaluating, by the computer, the geophysical model using the grid of points.

Another aspect of the present invention is to provide a system for evaluating a geophysical model using a grid of points representing locations in a subsurface geological region. The system comprises a computer readable memory and a computer processor in communication with the computer readable memory. The computer readable memory is configured to store the geophysical model of the subsurface geological region. The computer processor is configured to define, for the geophysical model, the grid of points representing the locations in the subsurface geological region, the grid of points comprising a plurality of points extending in at least one direction, the plurality of points being variably spaced apart in the at least one direction. The computer processor is further configured to evaluate the geophysical model using the grid of points.

Although the various steps of the method of providing are described in the above paragraphs as occurring in a certain order, the present application is not bound by the order in which the various steps occur. In fact, in alternative embodiments, the various steps can be executed in an order different from the order described above or otherwise herein.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
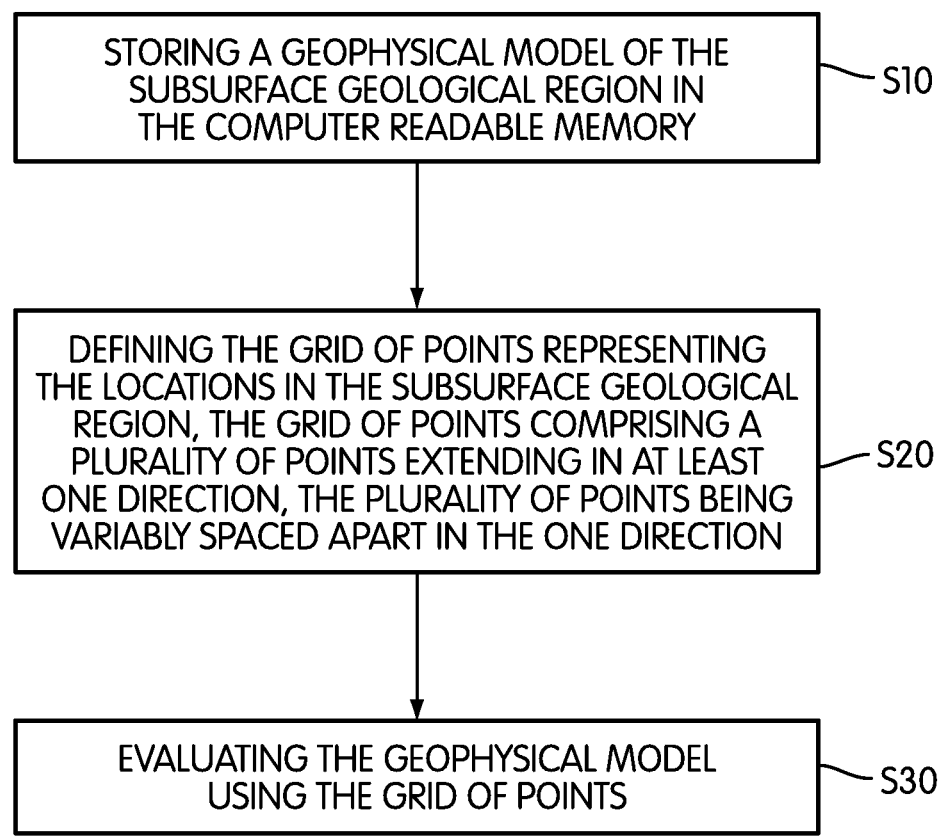
FIG. 1 is flow chart of a method for evaluating a geophysical model using a grid of points representing locations on a subsurface geological region, according to an embodiment of the present invention.

FIG. 1 is flow chart of a method for evaluating a geophysical model using a grid of points representing locations on a subsurface geological region, according to an embodiment of the present invention. In one embodiment, the method is implemented as a series of instructions which can be executed by a computer. As it can be appreciated, the term "computer" is used herein to encompass any type of computing system or device including a personal computer (e.g., a desktop computer, a laptop computer, or any other handheld computing device), or a mainframe or supercomputer, or a plurality of networked computers in a distributed computing environment.

For example, the method may be implemented as a software program application which can be stored in a computer readable medium such as hard disks, CDROMs, optical disks, DVDs, magnetic optical disks, RAMs, EPROMs, EEPROMs, magnetic or optical cards, flash cards (e.g., a USB flash card), PCMCIA memory cards, smart cards, or other media.

Alternatively, a portion or the whole software program product can be downloaded from a remote computer or server via a network such as the internet, an ATM network, a wide area network (WAN) or a local area network.

Alternatively, instead or in addition to implementing the method as computer program product(s) (e.g., as software products) embodied in a computer, the method can be implemented as hardware in which for example an application specific integrated circuit (ASIC) can be designed to implement the method.

Figure 2:
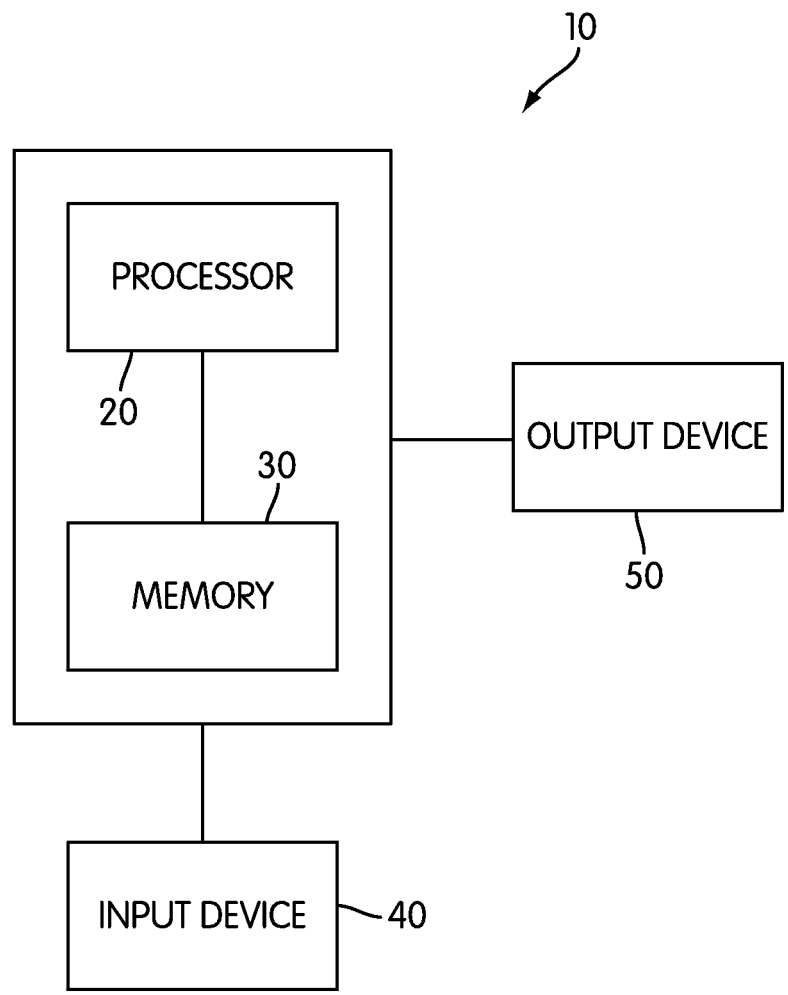
FIG. 2 is a schematic diagram representing a computer system for implementing the method, according to an embodiment of the present invention.

FIG. 2 is a schematic diagram representing a computer system 10 for implementing the method, according to an embodiment of the present invention. As shown in FIG. 2, computer system 10 comprises a processor (e.g., one or more processors) 20 and a memory 30 in communication with the processor 20. The computer system 10 may further include an input device 40 for inputting data (such as keyboard, a mouse or the like) and an output device 50 such as a display device for displaying results of the computation.

Figure 3:
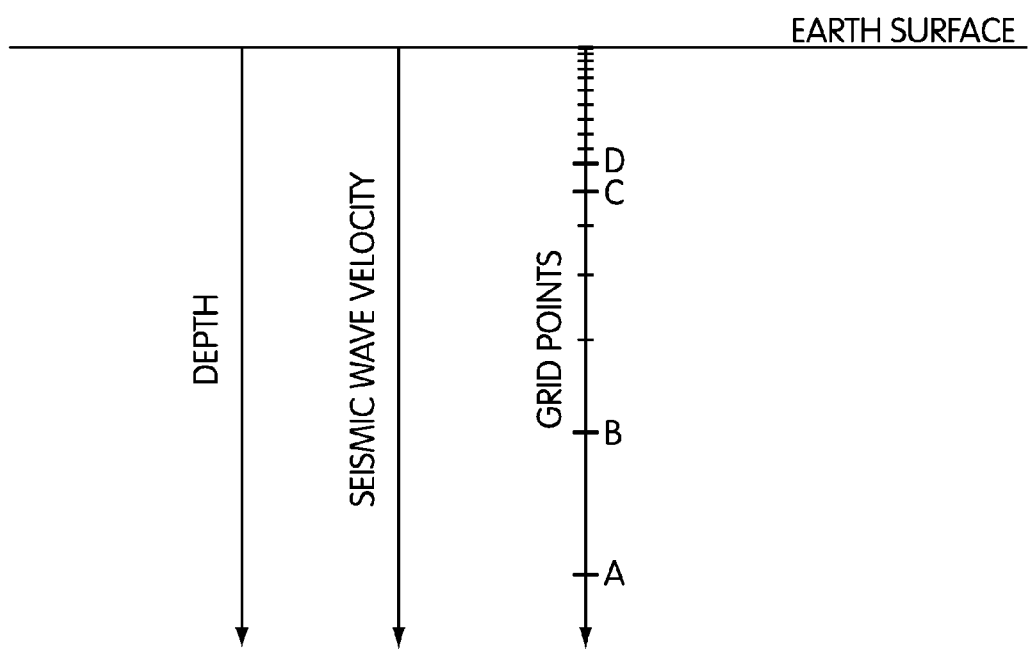
FIG. 3 is a schematic diagram depicting a relationship between depth, wave velocity and position of a grid of points along the vertical direction, according to an embodiment of the present invention.

As shown in FIG. 1, the method includes storing a geophysical model of the subsurface geological region in the computer readable memory 30, at S10. In one embodiment, the model of the earth is a seismic model of the earth. For example, the model of the earth may comprise providing a seismic wave velocity (e.g. sound wave velocity) for a portion of the earth, in which the wave velocity varies (e.g., increases) with a depth in a vertical direction from the earth surface, as shown in FIG. 3. For example, in one model, wave velocities near the surface of the earth, where the rock is less dense (e.g., a fluid or soft rock), are smaller than wave velocities deeper within the earth, where the rock is more dense (e.g., hard rock).

In one embodiment, the method further includes defining, for the geophysical model (e.g., earth model), the grid of points representing the locations in the subsurface geological region, the grid of points comprising a plurality of points extending in at least one direction, at S20. The plurality of points are variably spaced apart in the at least one direction.

The method further includes evaluating, by the computer, the geophysical model using the grid of points, at S30. In one embodiment, the evaluating model can include using a finite-difference computation method. A result of the evaluation (e.g., a result of the computing) can be output through output device 50 (shown in FIG. 2) or transmitted to other computing systems for further evaluation.

Thus, as it can be appreciated from the above, the computer processor 20 in communication with the computer readable memory 30 can be configured to define, for the geophysical model, the grid of points representing the locations in the subsurface geological region, the grid of points comprising a plurality of points extending in at least one direction, the plurality of points being variably spaced apart in the at least one direction; and to evaluate the geophysical model using the grid of points. The processor 20 can further be configured to output a result of evaluating the geophysical model through the output device 50 or transmit the result to another computer system (e.g., another computer processor) for further processing and/or evaluation.

In one embodiment, the plurality of points can be variably spaced apart such that points representing locations deeper within the subsurface geological region are spaced further apart than are points representing locations less deep within the subsurface geological region, as shown in FIG. 3. For example, points A and B which are located deeper within the subsurface are spaced further apart than points C and D which are located closer to the earth surface.

In one embodiment, the plurality of points shown in FIG. 3 are variably spaced apart on an expanding scale along the at least one direction (e.g., the vertical direction). In one embodiment, the expanding scale can be tailored to expand with increasing seismic wave velocity. For example, near the earth surface where the wave velocity is relatively slow a fine grid points can be used. Whereas, deeper within the earth where the wave velocity is relatively faster a coarse grid points can be used. In one embodiment, the expanding scale can be tailored to substantially track or match the increase in velocity. The expanding scale can follow, for example, a logarithmic scale, an exponential scale, a polynomial scale, or any hybrid formula scale which can include an exponential component, a polynomial component and/or a logarithmic component.

Although, only one direction (e.g., vertical direction) is represented in FIG. 3, as it can be appreciated the model can take into account more than one direction. For example, in one embodiment, when defining the grid of points, this may include selecting a plurality of points with a variable scale along a first direction (e.g., the vertical direction) and selecting another plurality of points with a fixed scale along a second direction (e.g., a direction substantially perpendicular to the vertical direction). In yet another embodiment, when defining the grid of points, this may further include selecting a plurality of points with a fixed scale along a third direction perpendicular to the first direction and the second direction.

Furthermore, although as depicted in FIG. 3, the expanding scale is used along one direction, the expanding scale can be used along more than one direction depending on the earth model used.

For example, in the case of a logarithmic expanding scale, a logarithmic function can be selected such that distances between two successive grid points are scaled by a constant multiplicative factor approximately equal to one. For example, in the case of a logarithmic scale, if an initial number of points for a grid of points that are equally spaced apart is N, a number n of the plurality of points in the expanding logarithmic scale can be determined by the following equation (1).

$$n = \ln(N^*e+1)/\ln(e+1) \quad (1)$$

where e is an expansion factor.

The expansion factor e can be selected as desired, for example to match the increase in the seismic wave velocity along the vertical direction. The expansion factor controls the amount of expansion between two successive points in the grid of points. In one embodiment, the expansion factor e is a positive number selected in a range between about 0 and about 0.01. For example, in one embodiment, the expansion factor is selected to be equal to about 0.003 which may be matched to natural changes in earth models with depth. By using an appropriate expansion factor e (e.g., e=0.003), the computation grid of points can be better matched to earth model properties in depth.

Figure 4:
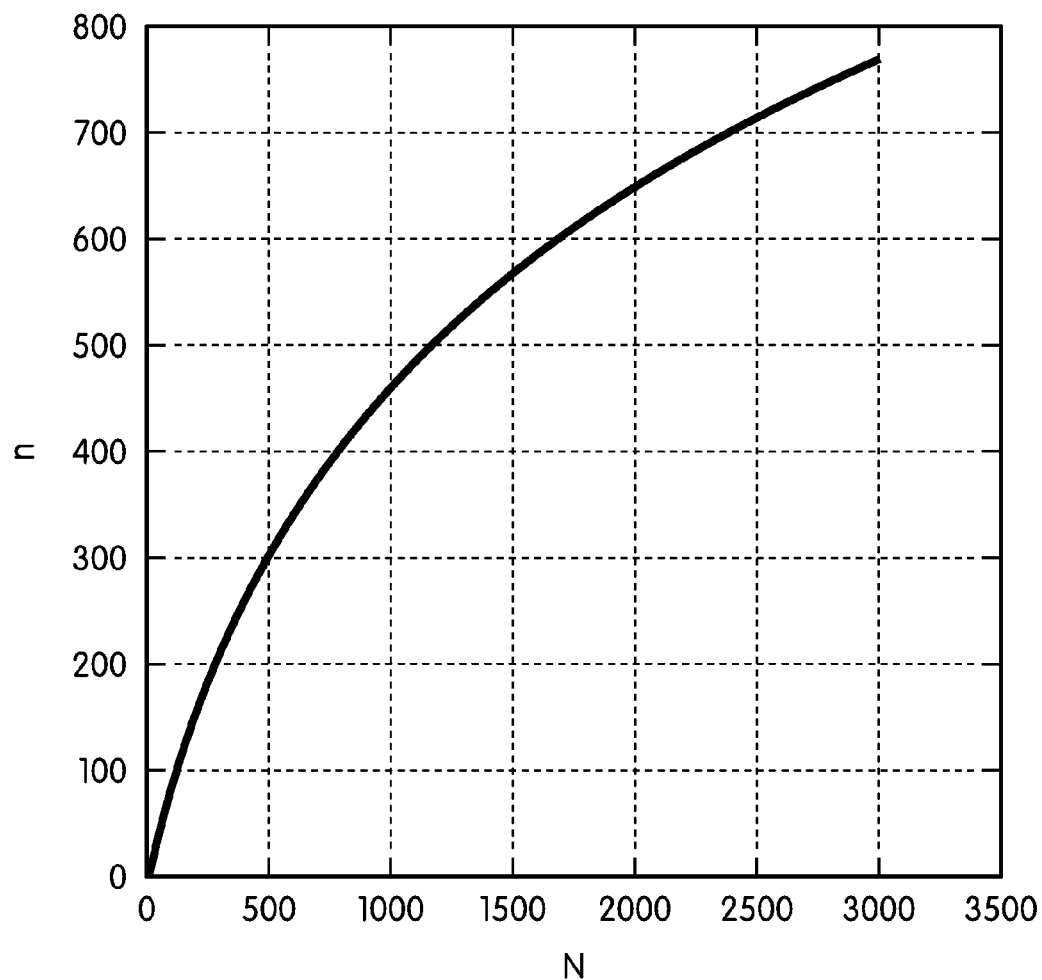
FIG. 4 is a plot of the number n of the plurality of points in the expanding logarithmic scale as a function of the initial number of points N for a grid of points that are equally spaced apart, when an expansion factor is set to about 0.003, according to an embodiment of the present invention.

FIG. 4 is a plot of the number n of the plurality of points in the expanding logarithmic scale as a function of the initial number of points N for a grid of points that are equally spaced apart, when the expansion factor is set to about 0.003, according to an embodiment of the present invention. As shown in FIG. 4, while the number n is approximately equal to the number N, when N is relatively small (e.g., less than 100), the number n is smaller than the number N, when N is relatively large (e.g., for N greater than 1000).

In general, by using an expanding scale (e.g., a logarithmic scale), the number of computational points can be reduced. As a result, a relative computing saving can be realized as a reduced number of points are used to compute or evaluate the model. For example, using an expanding logarithmic scale with an expansion factor e of about 0.003, for an old computational burden of N equal approximately 1000, a new computational burden n is approximately 464. Hence, the ratio of new points to old points is 0.46. Therefore, the cost of the new computation using a grid of points in an expanding scale is simply 46% of the cost of the old computation using a grid of points that are equally spaced apart.

Figure 5:
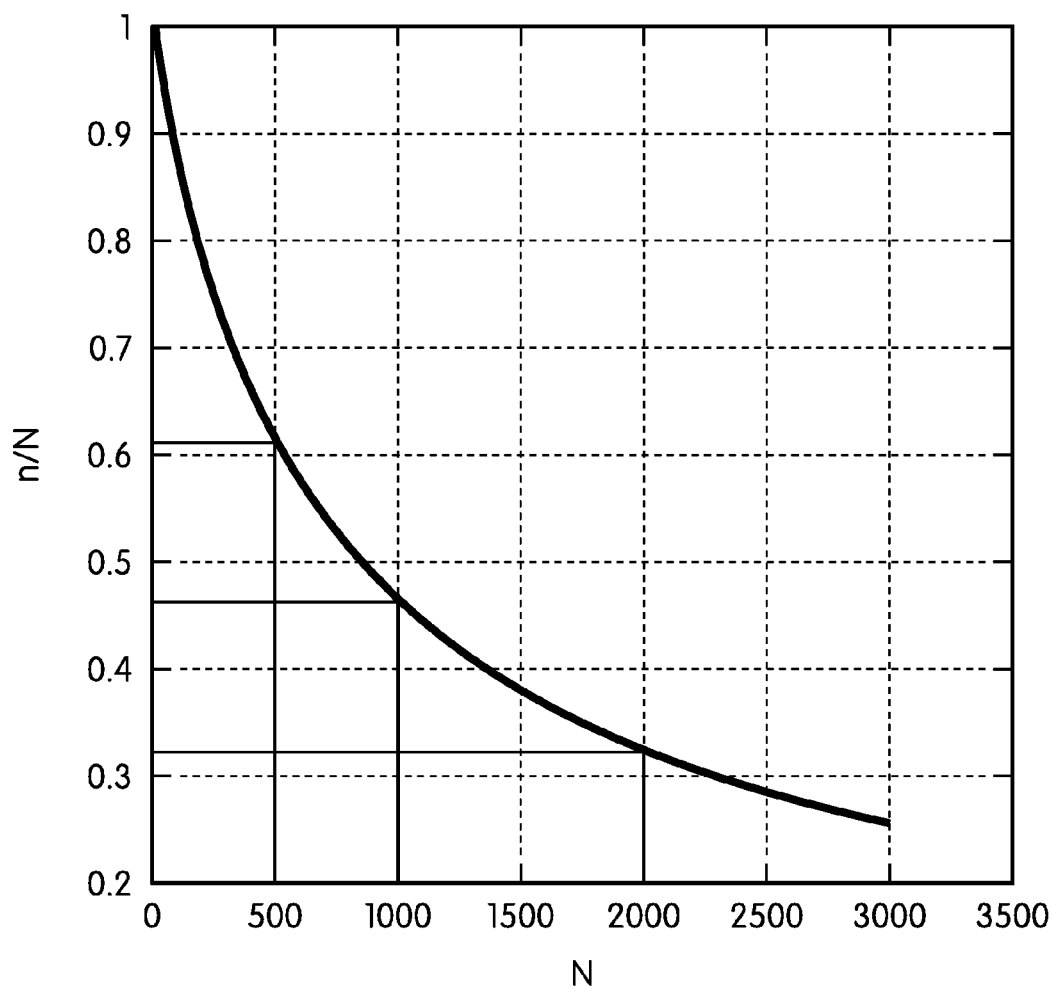
FIG. 5 is a plot of the ratio n to N as a function of the number of points N when using a logarithmic scale.

FIG. 5 is a plot of the ratio n to N as a function of the number of points N when using a logarithmic scale as defined in equation (1). As clearly shown in FIG. 5, as the number of points N gets larger, the relative computational saving improves, i.e., the saving increases with increasing initial number N of points. For example, as shown in FIG. 5, for a number of points N equals to about 500, the new cost of the computation is about 61% of the old cost of computation. For a number of points N equals to about 1000, the new cost of the computation is about 46% of the old cost of computation. For a number of points N equals to about 2000, the new cost of the computation is about 32% of the old cost of computation. The extra computational cost to realize these computational savings is around 1%. This extra computational cost originates from the multiplicative scale change (i.e., scale multiplication).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed is:

1. A computer-implemented method for evaluating a geophysical model using a grid of points representing locations in a subsurface geological region, comprising:
    storing a geophysical model of the subsurface geological region in a computer readable memory;
    defining, for the geophysical model, the grid of points representing the locations in the subsurface geological region, the grid of points comprising a plurality of points extending in at least one direction, the plurality of points being logarithmically variably spaced apart in the at least one direction, wherein a number n of the plurality of points is calculated using the following formula:

$n=\ln(N^*e+1)/\ln(e+1)$, where e is an expansion factor, and N is an initial number of points that are equally spaced apart; and
    evaluating, by the computer, the geophysical model using the grid of points.

2. The method of claim 1, wherein the plurality of points are logarithmically variably spaced apart such that points representing locations deeper within the subsurface geological region are spaced further apart than are points representing locations less deep within the subsurface geological region.

3. The method of claim 1, wherein the model of the earth is a seismic model of the earth.

4. The method of claim 3, wherein providing the model of the earth comprises providing a seismic wave velocity for a portion of the earth, the seismic wave velocity increasing with a depth in a vertical direction from the earth surface.

5. The method of claim 1, wherein defining the grid of points comprises selecting the plurality of points along a vertical direction.

6. The method of claim 1, wherein evaluating the geophysical model comprises computing the model using a finite difference computation method.

7. The method of claim 1, wherein e is a positive number selected in a range between 0 and 0.01.

8. The method of claim 7, wherein e is equal to about 0.003.

9. The method of claim 1, wherein defining the grid of points comprises selecting a plurality of points along a first direction and selecting another plurality of points with a fixed scale along a second direction.

10. The method of claim 9, wherein the first direction corresponds to a vertical direction and the second direction corresponds to a direction substantially perpendicular to the vertical direction.

11. The method of claim 9, wherein defining the grid of points comprises further selecting a plurality of points with a fixed scale along a third direction perpendicular to the first direction and the second direction.

12. The method of claim 1, further comprising outputting a result of the evaluating of the geophysical model.

13. A computer program product comprising a tangible nontransitory computer readable medium having instructions stored thereon that when executed by a computer performs the method recited in claim 1.

14. A system for evaluating a geophysical model using a grid of points representing locations in a subsurface geological region, comprising:
    a computer readable memory configured to store the geophysical model of the subsurface geological region; and
    a computer processor in communication with the computer readable memory, the computer processor being configured to:
    define, for the geophysical model, the grid of points representing the locations in the subsurface geological region, the grid of points comprising a plurality of points extending in at least one direction, the plurality of points being logarithmically variably spaced apart in the at least one direction, wherein a number n of the plurality of points is calculated using the following formula:

$n=\ln(N^*e+1)/\ln(e+1)$, where e is an expansion factor, and N is an initial number of points that are equally spaced apart; and evaluate the geophysical model using the grid of points.

15. The system of claim 14, wherein the processor is further configured to output a result of evaluating the geophysical model.

* * * * *